United States Patent
Worsley et al.

(10) Patent No.: US 10,233,087 B2
(45) Date of Patent: Mar. 19, 2019

(54) HIGHLY CRYSTALLINE 3D GRAPHENE

(71) Applicants: LAWRENCE LIVERMORE NATIONAL SECURITY, LLC, Livermore, CA (US); THE REGENTS OF THE UNIVERSITY OF CALIFORNIA, Oakland, CA (US)

(72) Inventors: Marcus A. Worsley, Hayward, CA (US); Leta Woo, Atlanta, GA (US); William Mickelson, Albany, CA (US); Alex Zettl, Kensington, CA (US)

(73) Assignees: Lawrence Livermore National Security, LLC, Livermore, CA (US); The Regents of the University of California, Oakland, CA (US)

( * ) Notice: Subject to any disclaimer, the term of this patent is extended or adjusted under 35 U.S.C. 154(b) by 321 days.

(21) Appl. No.: 14/820,411

(22) Filed: Aug. 6, 2015

(65) Prior Publication Data
US 2017/0036915 A1 Feb. 9, 2017

(51) Int. Cl.
*C01B 32/184* (2017.01)
*C01B 32/182* (2017.01)

(52) U.S. Cl.
CPC .......... *C01B 32/184* (2017.08); *C01B 32/182* (2017.08); *C01B 2204/22* (2013.01); *C01B 2204/32* (2013.01); *C01P 2002/82* (2013.01); *C01P 2006/10* (2013.01); *C01P 2006/12* (2013.01); *C01P 2006/14* (2013.01); *C01P 2006/40* (2013.01)

(58) Field of Classification Search
CPC . C01B 31/0446; C01B 32/182; C01B 32/184; C01B 2204/22; C01B 2204/32; C01P 2002/82; C01P 2006/10; C01P 2006/12; C01P 2006/14; C01P 2006/40
See application file for complete search history.

(56) References Cited

U.S. PATENT DOCUMENTS

| | | | |
|---|---|---|---|
| 8,993,113 B2 | 3/2015 | Pauzauskie et al. | |
| 9,314,777 B2 | 4/2016 | Worsley et al. | |
| 2012/0034442 A1* | 2/2012 | Pauzauskie | B82Y 30/00 428/219 |
| 2014/0178289 A1* | 6/2014 | Worsley | H01B 1/04 423/448 |
| 2014/0178759 A1 | 6/2014 | Worsley et al. | |

(Continued)

OTHER PUBLICATIONS

Shams et al. ("Graphene synthesis: a Review" Materials Science—Poland, 33(3), published May 13, 2015, p. 566-578).*

(Continued)

*Primary Examiner* — Travis M Figg
(74) *Attorney, Agent, or Firm* — Foley & Lardner, LLP

(57) ABSTRACT

Disclosed here is a composition comprising at least one graphene aerogel comprising a three-dimensional structure of graphene sheets, wherein the graphene sheets are covalently interconnected, and wherein the graphene aerogel is highly crystalline. Also described is a method for making a graphene aerogel, comprising preparing a mixture comprising a graphene oxide suspension and at least one catalyst; curing the reaction mixture to produce a wet gel; drying the wet gel to produce a dry gel; and pyrolyzing the dry gel at a temperature of 1500-3500° C. to produce the graphene aerogel.

20 Claims, 8 Drawing Sheets

(56) References Cited

U.S. PATENT DOCUMENTS

2015/0175425 A1    6/2015   Pauzauskie et al.
2016/0145504 A1    5/2016   Worsley et al.

OTHER PUBLICATIONS

Punckt et al. ("The effect of degree of reduction on the electrical properties of functionalized graphene sheets" Appl. Phys. Lett. 2013, 102, 023114) (Year: 2013).*
Bae, S. et al. (2010) "Roll-to-Roll Production of 30-Inch Graphene Films for Transparent Electrodes," Nat. Nanotechnol. 5:574-578.
Bai, H. et al. (2010) "A Ph-Sensitive Graphene Oxide Composite Hydrogel," Chem. Commun. 46:2376-2378.
Bai, H. et al. (2011) "On the Gelation of Graphene Oxide," J. Phys. Chem. C 115:5545-5551.
Balaya, P. (2008) "Size Effects and Nanostructured Materials for Energy Applications," Energy Environ. Sci. 1:645-654.
Batson, P.E. (1993) "Carbon 1s near-edge-absorption fine structure in graphite," Phys. Rev. B 48(4):2608-2610.
Bernard, S. et al. (2010) "XANES, Raman and XRD Study of Anthracene-Based Cokes and Saccharose-Based Chars Submitted to High-Temperature Pyrolysis," Carbon 48:2506-2516.
Biener, J. et al. (2011) "Advanced carbon aerogels for energy applications," Energy & Environmental Science 4:656-667.
Cancado, L.G. et al. (2006) "General Equation for the Determination of the Crystallite Size L-a of Nanographite by Raman Spectroscopy," Appl. Phys. Lett. 88:163106-1-163106-3.
Chen, D. et al. (2010) "Graphene-Based Materials in Electrochemistry," Chem. Soc. Rev. 39:3157-3180.
Chen, W. et al. (2011) "In Situ Self-Assembly of Mild Chemical Reduction Graphene for Three-Dimensional Architectures," Nanoscale 3:3132-3137.
Chen, Z.P. et al. (2011) "Three-Dimensional Flexible and Conductive Interconnected Graphene Networks Grown by Chemical Vapour Deposition," Nat. Mater. 10:424-428.
Chmiola, J. et al. (2006) "Anomalous Increase in Carbon Capacitance at Pore Sizes Less Than 1 Nanometer," Science 313:1760-1763.
Cody, G.D. et al. (2008) "Organic Thermometry for Chondritic Parent Bodies," Earth. Planet. Sci. Lett. 272:446-455.
Ferrari, A.C. et al. (2000) "Interpretation of Raman Spectra of Disordered and Amorphous Carbon," Phys. Rev. B 61:14095-14107.
Ferrari, A.C. et al. (2006) "Raman Spectrum of Graphene and Graphene Layers," Phys. Rev. Lett. 97:187401-1-187401-4.
Ferreira, E.H.M. et al. (2010) "Evolution of the Raman Spectra from Single-, Few-, and Many-Layer Graphene with Increasing Disorder," Phys. Rev. B 82:125429-1-125429-9.
Fricke, J. et al. (1992) "Aerogels," J. Am. Ceram. Soc. 75:2027-2036.
Guo, C.X. et al. (2010) "Layered Graphene/Quantum Dots for Photovoltaic Devices," Angew. Chem. 49:3014-3017.
He, S.J. et al. (2010) "A Graphene Nanoprobe for Rapid, Sensitive, and Multicolor Fluorescent DNA Analysis," Adv. Funct. Mater. 20:453-459.
Jeong, H.K. et al. (2008) "X-Ray Absorption Spectroscopy of Graphite Oxide," EPL 82:67004, 1-5.
Jeong, H.K. et al. (2009) "Comment on 'Near-Edge X-Ray Absorption Fine-Structure Investigation of Graphene'," Phys. Rev. Lett. 102:099701-1.
Jia, J.J. et al. (1995) "First Experimental Results from Ibm/Tenn/Tulane/Llnl/Lbl Undulator Beamline at the Advanced Light-Source," Rev. Sci. Instrum. 66:1394-1397.
Jung, S.M. et al. (2012) "A Facile Route for 3d Aerogels from Nanostructured 1d and 2d Materials," Sci. Rep. 2:849, 1-6.
Kalluri, R.K. et al. (2013) "Unraveling the Potential and Pore-Size Dependent Capacitance of Slit-Shaped Graphitic Carbon Pores in Aqueous Electrolytes," Phys. Chem. Chem. Phys. 15:2309-2320.
Korhonen, J.T. et al. (2011) "Hydrophobic Nanocellulose Aerogels as Floating, Sustainable, Reusable, and Recyclable Oil Absorbents," ACS Appl. Mater. Interfaces 3:1813-1816.
Kucheyev, S.O. et al. (2009)"Depth-Sensing Indentation of Low-Density Brittle Nanoporous Solids," Acta Mater. 57:3472-3480.
Li, J.H. et al. (2014) "Ultra-Light, Compressible and Fire-Resistant Graphene Aerogel as a Highly Efficient and Recyclable Absorbent for Organic Liquids," J. Mater. Chem. A 2:2934-2941.
Li, Z.Q. et al. (2007) "X-Ray Diffraction Patterns of Graphite and Turbostratic Carbon," Carbon 45:1686-1695.
Lin, Y. et al. (2011) "Superhydrophobic Functionalized Graphene Aerogels," ACS Appl. Mater. Interfaces 3:2200-2203.
Liu, X.F. et al. (2011) "Systematic Pore-Size Effects of Nanoconfinement of Libh4: Elimination of Diborane Release and Tunable Behavior for Hydrogen Storage Applications," Chem. Mater. 23:1331-1336.
Lu, X. et al. (1992) "Thermal-Conductivity of Monolithic Organic Aerogels," Science 255:971-972.
Ma, Y. et al. (1993) "Core Excitons and Vibronic Coupling in Diamond and Graphite," Phys. Rev. Lett. 71 (22):3725-3728.
Mecklenburg, M. et al. (2012) "Aerographite: Ultra Lightweight, Flexible Nanowall, Carbon Microtube Material with Outstanding Mechanical Performance," Adv. Mater. 24:3486-3490.
Nardecchia, S. et al. (2013) "Three Dimensional Macroporous Architectures and Aerogels Built of Carbon Nanotubes and/or Graphene: Synthesis and Applications," Chem. Soc. Rev. 42:794-830.
Novoselov, K.S. et al. (2004) "Electric Field Effect in Atomically Thin Carbon Films," Science 306:666-669.
Oliver, W.C. et al. (1992) "An Improved Technique for Determining Hardness and Elastic-Modulus Using Load and Displacement Sensing Indentation Experiments," J. Mater. Res. 7:1564-1583.
Pajonk, G.M. (1997) "Catalytic Aerogels," Catal. Today 35:319-337.
Porada, S. et al. (2013) "Direct Prediction of the Desalination Performance of Porous Carbon Electrodes for Capacitive Deionization," Energy Environ. Sci. 6:3700-3712.
Qiu, L. et al. (2012) "Biomimetic Superelastic Graphene-Based Cellular Monoliths," Nat. Commun. 3:1241.
Schwierz, F. (2010) "Graphene Transistors," Nat. Nanotechnol. 5:487-496.
Stankovich, S. et al. (2006) "Graphene-Based Composite Materials," Nature 442:282-286.
Sun, H.Y. et al. (2013) "Multifunctional, Ultra-Flyweight, Synergistically Assembled Carbon Aerogels," Adv. Mater. 25:2554-2560.
Tang, Z.H. et al. (2010) "Noble-Metal-Promoted Three-Dimensional Macroassembly of Single-Layered Graphene Oxide," Angew. Chem. 49:4603-4607.
Tuinstra, F. et al. (1970) "Raman Spectrum of Graphite," J. Chem. Phys. 53(3):1126-1130.
Wiener, M. et al. (2006) "Thermal Conductivity of Carbon Aerogels as a Function of Pyrolysis Temperature," Int. J. Thermophys. 27:1826-1843.
Worsley, M.A. et al. (2010) "Synthesis of Graphene Aerogel with High Electrical Conductivity," J. Am. Chem. Soc. 132:14067-14069.
Worsley, M.A. et al. (2011) "High Surface Area, sp2-Cross-Linked Three-Dimensional Graphene Monoliths," J. Phys. Chem. Lett. 2:921-925.
Worsley, M.A. et al. (2012) "Mechanically robust 3D graphene macroassembly with high surface area," Chem. Commun. 48:8428-8430.
Worsley, M.A. et al. (2014) "Toward Macroscale, Isotropic Carbons with Graphene-Sheet-Like Electrical and Mechanical Properties," Adv. Funct. Mater. 24:4259-4264.
Xin, G.Q. et al. (2014) "Large-Area Freestanding Graphene Paper for Superior Thermal Management," Adv. Mater. 26:4521-4526.
Xu, Y. et al. (2010) "Self-Assembled Graphene Hydrogel Via a One-Step Hydrothermal Process," ACS Nano 4:4324, 1-7.
Yoo, J.J. et al. (2011) "Ultrathin Planar Graphene Supercapacitors," Nano Lett. 11:1423-1427.

(56) References Cited

OTHER PUBLICATIONS

Zhang, X. et al. (2011) "Mechanically Strong and Highly Conductive Graphene Aerogel and Its Use as Electrodes for Electrochemical Power Sources," J. Mater. Chem. 21:6494-6497.

* cited by examiner

HIGHLY CRYSTALLINE 3D GRAPHENE

STATEMENT OF GOVERNMENT SUPPORT

This invention was made with government support under Contract Nos. DE-AC52-07NA27344 and DE-AC02-05CH11231 awarded by the U.S. Department of Energy and under Grant No. EEC-0832819 awarded by the National Science Foundation. The government has certain rights in this invention.

BACKGROUND

Since its discovery, graphene has been a highly investigated material across a wide range of research fields. Its exceptional properties, such as electrical conductivity of up to $10^4$ S/cm, elastic modulus of up to 1 TPa, and surface area of over 2500 m$^2$/g have inspired applications in electronics, conductive composites, catalysis, photovoltaics, energy storage, and biology. Recent efforts to build three-dimensional (3D) architectures of graphene have demonstrated significantly enhanced performance due to increased active material per projected area. Several methods have been proposed for building 3D graphene, including chemical vapor deposition (CVD), colloidal gelation, sol-gel, and graphene oxide (GO)-based gelation. While CVD is the most common method for high quality two-dimensional (2D) graphene film growth, 3D graphene structures available via CVD are macroporous foams due to limitations imposed by the requirement for growth on a metal support. As a consequence, chemically derived GO-based graphene aerogels are the most common 3D graphene found in the literature due to their simple and versatile fabrication process and the ability to realize a wide range of pore morphologies, including ultrafine pore sizes (<100 nm). The ultrafine pore sizes in aerogels are a key advantage over macroporous foams in a number of applications. For example, small pores have shown enhanced capacitance relative to larger pores, leading to performance enhancements in supercapacitor and capacitive desalination applications. Similarly, the small pore sizes and high surface areas in aerogels have also proved advantageous in technologies, such as hydrogen storage, catalysis, batteries, filtration, insulation, and sorbents. In general, the GO-based graphene aerogels are formed by inducing the gelation of an aqueous GO suspension, such that the GO is partially reduced and forms a porous 3D network within the fluid. Upon removal of the fluid phase via critical point drying (or freeze-drying), the dry 3D graphene emerges. However, the quality of the graphene sheets in these chemically derived graphene aerogels is less favorable compared to the graphene produced via mechanical exfoliation or CVD. This translates to macroscale bulk properties, such as electrical conductivity, that are less favorable than those of CVD-grown 3D graphene used in conductive polymer composites.

Therefore, a need exists for improving the quality of chemically derived graphene aerogels.

SUMMARY

Disclosed here is a method for preparing chemical-derived GO-based graphene aerogels of a quality (e.g., defect density, crystallinity, and domain size) approaching or surpassing that of CVD-grown 3D graphene yet retaining the characteristic pore size distribution of chemically derived graphene aerogels. The general strategy involves subjecting a GO-based 3D graphene to high temperature annealing.

In contrast to template-driven CVD-grown 3D graphene, which results in a macroporous foam, the annealed GMA possesses ultrafine pore sizes making it a true graphene aerogel. Moreover, the superior quality 2D graphene building blocks result in an order of magnitude improvement in bulk electrical conductivity versus previously reported graphene aerogels. Thus, the highly crystalline GMA exhibits conductivity on the order of CVD-grown macro-porous graphene foam while maintaining significant pore volume in the submicron regime.

Therefore, one aspect of some embodiments of the invention described herein relates to a composition comprising at least one graphene aerogel comprising a three-dimensional structure of graphene sheets, wherein the graphene sheets are covalently interconnected, and wherein the graphene aerogel is highly crystalline.

Another aspect of some embodiments of the invention described herein relates to a method for making a graphene aerogel, comprising: preparing a mixture comprising a graphene oxide suspension and at least one catalyst; curing the mixture to produce a wet gel; drying the wet gel to produce a dry gel; and thermally annealing the dry gel at a temperature of 1500-3500° C. to produce the graphene aerogel.

A further aspect of some embodiments of the invention described herein relates to a composite derived from the highly crystalline graphene aerogel, such as a composite comprising a metal or a metal compound, a silicon or boron compound, and/or a polymer coating deposited or disposed onto the internal surfaces of the graphene aerogel.

These and other features, together with the organization and manner of operation thereof, will become apparent from the following detailed description when taken in conjunction with the accompanying drawings.

Figure 1:
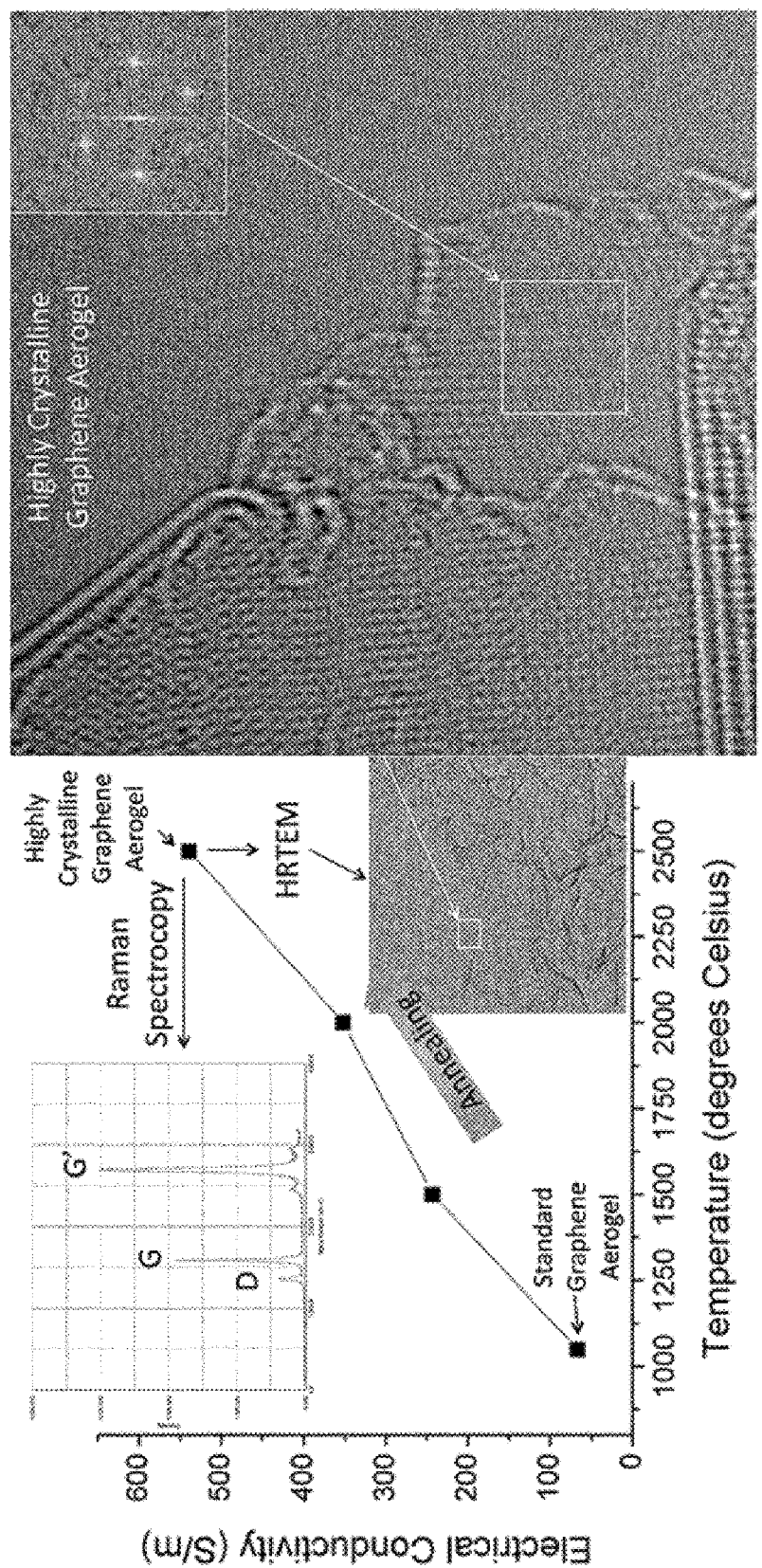
FIG. 1: Highly crystalline graphene aerogels with excellent electrical conductivity obtained at high annealing temperatures.

wherein $A_{load}$ is the area under the loading curve and $A_{unload}$ is the area under the unloading curve.

DETAILED DESCRIPTION

Reference will now be made in detail to some specific embodiments of the invention contemplated by the inventors for carrying out the invention. Certain examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Highly Crystalline Graphene Aerogel

Many embodiments of the invention described herein relate to a composition comprising at least one graphene aerogel comprising a three-dimensional structure of graphene sheets, wherein the graphene sheets are covalently interconnected, and wherein the graphene aerogel is highly crystalline.

The high crystallinity of the graphene aerogel can be evidenced by its Raman signature. In some embodiments, the graphene aerogel has a Raman spectra in which $I_D/I_G$ is 0.8 or less, or 0.7 or less, or 0.6 or less, or 0.5 or less, or 0.4 or less, or 0.3 or less, or 0.2 or less. In some embodiments, the graphene aerogel has a Raman spectra in which $I_{G'}/I_G$ is 0.5 or more, or 0.7 or more, or 0.9 or more, or 1.1 or more, or 1.3 or more, or 1.5 or more.

The highly crystalline graphene aerogel described herein can have large crystallite size, which means large single crystal graphene domains. Crystallite size ($L_a$) can be calculated according to the method of Cancado et al., *Appl. Phys. Lett.*, 2006, 88:163106 or the method of Tuinsta and Koenig, *J. Chem. Phys.*, 1970, 53:1126, each of which is incorporated herein by reference. In some embodiments, the graphene aerogel has an average crystallite size $L_a$ of 20 nm or more, or 40 nm or more, or 60 nm or more, or 80 nm or more, or 100 nm or more, or 120 nm or more, or 150 nm or more, as calculated according to the Cancado method. In some embodiments, the graphene aerogel has an average crystallite size $L_a$ of 10 nm or more, 20 nm or more, or 30 nm or more, or 40 nm or more, as calculated according to the Tuinsta and Koenig method.

The highly crystalline graphene aerogel described herein can be electrically conductive. In some embodiments, the graphene aerogel has an electrical conductivity of 200 S/m or more, or 300 S/m or more, or 400 S/m or more, or 500 S/m or more, or 600 S/m or more.

The highly crystalline graphene aerogel described herein can be thermally conductive.

The highly crystalline graphene aerogel described herein can be thermally stable in air. In some embodiments, the graphene aerogel has an oxidation temperature $T_O$ of 600° C. or more, or 650° C. or more, or 700° C. or more, or 750° C. or more, or 800° C. or more.

The highly crystalline graphene aerogel described herein can be mechanically strong. In some embodiments, the graphene aerogel has a Young's modulus of 50 MPa or more, or 80 MPa or more, or 100 MPa or more, or 120 MPa or more, or 140 MPa or more.

The highly crystalline graphene aerogel described herein can have a low bulk density. In some embodiments, the graphene aerogel has a density of 200 mg/ml or less, 100 mg/ml or less, or 80 mg/ml or less, or 60 mg/ml or less, or 50 mg/ml or less.

The highly crystalline graphene aerogel described herein can have a high surface area. In some embodiments, the graphene aerogel has a BET surface area of 300 m$^2$/g or more, or 400 m$^2$/g or more, or 500 m$^2$/g or more, or 600 m$^2$/g or more, or 800 m$^2$/g or more.

In some embodiments, the graphene aerogel has a total pore volume of 1 cm$^3$/g or more, or 1.5 cm$^3$/g or more, or 2 cm$^3$/g or more, or 2.5 cm$^3$/g or more, or 3 cm$^3$/g or more.

The highly crystalline graphene aerogel described herein can have ultrafine pore sizes (e.g., <100 nm), in contrast to macroporous foams. In some embodiments, pores having a diameter of 100 nm or less account for 30% or more, or 40% or more, or 50% or more, or 60% or more, or 70% or more, or 80% or more of the graphene aerogel's total pore volume. In some embodiments, pores having a diameter of 100 nm or less account for 50% or more, or 60% or more, or 70% or more, or 80% or more, or 90% or more, or 95% or more of the total number of pores in the graphene aerogel.

In some embodiments, Barrett-Joyner-Halenda (BJH) pore volume as measured by nitrogen porosimetry can be used as a metric. In some embodiments, pores having a diameter of 100 nm or less account for 40% or more, or 50% or more, or 60% or more, or 70% or more, or 80% or more of the porosity as defined by BJH pore volume. In some embodiments, pores having a diameter of 50 nm or less account for 40% or more, or 50% or more, or 60% or more, or 70% or more, or 80% or more of the porosity as defined by BJH pore volume. In some embodiments, pores having a diameter of 20 nm or less account for 40% or more, or 50% or more, or 60% or more, or 70% or more, or 80% or more of the porosity as defined by BJH pore volume. In some embodiments, pores having a diameter of 10 nm or less account for 40% or more, or 50% or more, or 60% or more, or 70% or more, or 80% or more of the porosity as defined by BJH pore volume.

The highly crystalline graphene aerogel described herein can comprise a three-dimensional structure of graphene sheets interconnected or crosslinked by chemical bonds such as covalent carbon-carbon bonds. In some embodiments, 50% or more, or 70% or more, or 80% or more, or 90% or more of the covalent bonds interconnecting the graphene sheets are $sp^2$ carbon-carbon bonds. In some embodiments, 10% or less, or 5% or less, or 3% or less, or 1% or less of the graphene sheets are interconnected only by physical bonds. In some embodiments, 10% or less, or 5% or less, or 3% or less, or 1% or less of the graphene sheets are interconnected only by metal crosslinks.

The highly crystalline graphene aerogel described herein can be substantial free of graphene sheets with hydroxyl or epoxide functionalities. In some embodiments, 3% or less, or 1% or less, or 0.5% or less, or 0.1% or less of the carbon atoms in the graphene aerogel are connected to a hydroxyl or epoxide functionality. In some embodiments, the atomic oxygen content in the graphene aerogel is 10% or less, or 5% or less, or 3% or less, or 1% or less.

In some embodiments, the graphene aerogel is in the form of a monolith having at least one lateral dimension of 100 microns or more, or 1 mm or more, or 10 mm or more, or 100 mm or more, or 1 cm or more.

In some embodiments, the graphene aerogel consists essentially of covalently interconnected graphene sheets.

In some embodiments, the graphene aerogel is not a macroporous foam. In some embodiments, the graphene aerogel is substantially free of a polymer coated on the internal surfaces of the graphene aerogel. In some embodiments, the graphene aerogel is substantially free of a metal or a metal compound coated on the internal surfaces of the graphene aerogel. In some embodiments, the graphene aerogel is substantially free of carbon nanoparticles.

Method for Making Highly Crystalline Graphene Aerogel

A further aspect of some embodiments of the invention described herein relates to a method for making a highly crystalline graphene aerogel, comprising: preparing a reaction mixture comprising a graphene oxide (GO) suspension and at least one catalyst; curing the reaction mixture to produce a wet gel; drying the wet gel to produce a dry gel; and thermally annealing the dry gel at a temperature of 1500-3500° C. to produce the highly crystalline graphene aerogel.

In some embodiments, the reaction mixture comprises a GO suspension. Methods for making GO are known in the art and disclosed in, for example, Hummer, J. Am. Chem. Soc., 80:1339 (1958), which is incorporated herein by reference. In some embodiments, the GO suspension is an aqueous suspension. In some embodiments, the GO suspension is a suspension of at least one organic solvent, such as alcohol, dimethylformamide, tetrahydrofuran, ethylene glycol, N-methylpyrrolidone, etc. In some embodiments, the GO suspension is an aqueous suspension made by sonicating GO in deionized water. The time for sonication can range from 0.25-24 hours. The concentration of GO in the reaction mixture can be 0.1 mg/cm$^3$ or more, or 1 mg/cm$^3$ or more, or 2 mg/cm$^3$ or more, or 5 mg/cm$^3$ or more, or 10 mg/cm$^3$ or more.

In some embodiments, the reaction mixture comprises at least one catalyst. In some embodiments, the catalyst is an acid catalyst. In some embodiments, the catalyst is a base catalyst. In some embodiments, the catalyst is ammonium hydroxide. Other suitable catalysts include, but are not limited to, nitric acid, acetic acid, ascorbic acid, hydrochloric acid, sulfuric acid, sodium carbonate, sodium hydroxide, and calcium sulfate. The reactant-to-catalyst ratio may range from 10 to greater than 1000.

In some embodiments, the reaction mixture consists essentially of the graphene oxide, the catalyst, and the solvent.

In some embodiments, the reaction mixture is cured at a temperature of 25-100° C. to produce a wet gel. In some embodiments, the reaction mixture is cured for 12-72 hours at a temperature of 85° C. In some embodiments, the reaction mixture is cured at atmospheric pressure.

In some embodiments, the wet gel is subjected to solvent exchange to remove reaction by-products. Suitable solvent include, but are not limited to, DI water. In some embodiments, the wet gel is subjected to solvent exchange to remove water. Suitable solvents include, but are not limited to, acetone.

In some embodiments, the wet gel is dried under supercritical condition (e.g., using supercritical $CO_2$). In some embodiments, the wet gel is dried under ambient temperature and pressure. In some embodiments, the wet gel is freeze dried.

In some embodiments, the dry gel is initially thermally annealed in an inert gas (e.g., nitrogen) at a lower temperature (e.g., 1050° C.) to produce a base graphene aerogel, wherein the base graphene aerogel is further thermally annealed in a noble gas (e.g., He) at a temperature of 1500-3500° C. to produce the highly crystalline graphene aerogel. The temperature for the further thermally annealing step can be at, for example, about 1500-2000° C., or about 2000-2500° C., or about 2500-3500° C., or about 2000-3000° C.

In some embodiments, the dry gel is directly thermally annealed in a noble gas (e.g., He) at a temperature of 1500-3500° C. to produce the highly crystalline graphene aerogel. The temperature for the thermally annealing step can be at, for example, about 1500-2000° C., or about 2000-2500° C., or about 2500-3500° C., or about 2000-3000° C.

In some embodiments, the process for making the highly crystalline graphene aerogel does not comprise chemical vapor deposition (CVD). In some embodiments, the process for making the highly crystalline graphene aerogel does not involve the use of a metal support. In some embodiments, the process for making the highly crystalline graphene aerogel does not produce a macroporous foam.

Composite Derived From Highly Crystalline Graphene Aerogel

A further aspect of the invention described herein relates to a composite derived from the highly crystalline graphene aerogel.

The composite can comprise, for example, a metal or a metal compound deposited or disposed onto the internal surfaces of the graphene aerogel. The metal or metal compound can be deposited or disposed throughout the entire thickness of the graphene aerogel. In some embodiments, the composite comprises a metal nanoparticle deposited or disposed onto the internal surfaces of the graphene aerogel. In some embodiments, the composite comprises a metal oxide deposited or disposed onto the internal surfaces of the graphene aerogel. In some embodiments, the composite comprises a metal chalcogenide (e.g., a metal sulfide) deposited or disposed onto the internal surfaces of the graphene aerogel. In some embodiments, the composite comprises a metal nitride deposited or disposed onto the internal surfaces of the graphene aerogel. In some embodiments, the composite comprises a metal carbide deposited or disposed onto the internal surfaces of the graphene aerogel. In some embodiments, the composite comprises a metal carbonitride deposited or disposed onto the internal surfaces of the graphene aerogel. Methods for depositing the metal or metal compound can be found in U.S. Pat. No. 8,664,143, US Pat. Pub. No. 2014/0121425, US Pat. Pub. No. 2014/0178759, and U.S. patent application Ser. No. 14/485,474, each of which is incorporated herein by reference.

The composite can comprise, for example, a silicon or boron compound deposited or disposed onto the internal surfaces of the graphene aerogel. The silicon or boron compound can be deposited or disposed throughout the entire thickness of the graphene aerogel. In some embodiments, the composite comprises a silicon compound (e.g., silicon oxide, silicon carbide, silicon nitride) deposited or disposed onto the internal surfaces of the graphene aerogel. In some embodiments, the composite comprises a boron compound (e.g., boron nitride) deposited or disposed onto the internal surfaces of the graphene aerogel. Methods for depositing or deriving the silicon or boron compound can be found in U.S. Pat. No. 8,629,076 and US Pat. Pub. No. 2015/0004087, each of which is incorporated herein by reference.

The composite can comprise, for example, a polymer deposited or disposed onto the internal surfaces of the graphene aerogel. The polymer can be deposited or disposed throughout the entire thickness of the graphene aerogel. In some embodiments, the composite comprises polydimethylsiloxane or epoxy deposited or disposed onto the internal surfaces of the graphene aerogel. Methods for depositing the polymer can be found in U.S. Pat. No. 9,087,625, which is incorporated herein by reference.

Applications

The highly crystalline graphene aerogels described herein can be used in a variety of devices. For example, they can be used in heat sinks, electrodes, batteries, capacitors, supercapacitors, sensors, actuators, membranes, structural elements, furnace components, catalysts and catalyst supports, desalination devices, and hydrogen storage devices.

WORKING EXAMPLES

Example 1—Methods

Highly Crystalline Graphene Aerogel. Graphene aerogel samples were initially prepared according to the method described in Worsley et al., *Chem. Commun.*, 48:8428-8430 (2012) or Worsley et al., *Adv. Funct. Mater.*, 24:4259-4264 (2014), each of which is incorporated herein by reference. The 3D graphene was prepared by gelation of a GO suspension under basic conditions. The aqueous GO suspension (1-2 wt %) was prepared by ultrasonication. In a glass vial, 3 ml of the GO suspension was mixed with 500 ml concentrated $NH_4OH$. The vial was sealed and placed in an oven at 85° C. overnight. The resulting wet gel was washed in deionized water to purge $NH_4OH$ followed by an exchange of water with acetone inside the pores. Supercritical $CO_2$ was used to dry the gels that were then converted to the final 3D graphene macroassembly by pyrolysis at 1050° C. under nitrogen. Alternatively, the reduced GO gel can also be dried under ambient conditions instead of using a supercritical solvent extraction method.

All graphene macroassemblies (GMA) prepared according to the above method received the standard thermal anneal at 1050° C. for 3 h in nitrogen. To prepare the highly crystalline GMA samples, the standard GMA was subjected to an additional thermal anneal for 1 h in He at 1500° C., 2000° C., or 2500° C. Thus, GMA samples treated at 1050, 1500, 2000, and 2500° C. were prepared and characterized according to the following methods.

Electron Microscopy.

High-resolution transmission electron microscopy (HR-TEM) characterization was performed on a JEOL JEM 2010 electron microscope and on TEAM 1.0, which is a double-aberration-corrected S/TEM with a resolution of 50 pm. All the HRTEM images were taken under TEM mode operated at 80 keV to minimize beam damage to the samples. The aerogels were sonicated in IPA and then dropcast onto lacey carbon TEM grids for analysis.

X-ray Absorption Spectroscopy.

X-ray absorption spectroscopy (XAS) measurements were performed on beamline 8.0.1 of the Advanced Light Source, Lawrence Berkeley National Laboratory. All XAS spectra were recorded at the carbon K-edge (from 280 to 330 eV) in the total electron yield mode via the drainage current from the experimental sample of interest. Calibration of the energy scale of BL8.0.1 was achieved by assigning an energy of 285.38 eV to the C(1s)→π* resonance of a freshly cleaved sample of highly oriented pyrolytic graphite. Each XAS spectrum was normalized to the incident flux ($I_O$), which was measured concurrently via the drainage current from a gold mesh located upstream of the experimental sample. In addition, the XAS spectra were normalized to the magnitude of the absorption edge step, which was taken as the difference in signal between the pre-edge (280 eV) and postedge (330 eV) regions. All XAS measurements were performed at an angle of incidence of 45° between the experimental sample and the incident X-ray beam.

Nitrogen Porosimetry.

Textural properties were determined by Brunauer-Emmett-Teller (BET) and Barrett-Joyner-Halenda (BJH) methods using an ASAP 2020 surface area analyzer (Micromeritics Instrument Corp.) via nitrogen porosimetry. Samples of approximately 0.1 g were heated to 300° C. under vacuum ($10^{-5}$ Torr) for at least 24 h to remove all adsorbed species.

X-Ray Diffraction.

X-ray diffraction (XRD) measurements were performed on a Bruker AXS D8 ADVANCE X-ray diffractometer equipped with a LynxEye 1-dimensional linear Si strip detector. The samples were scanned from 5 to 75° 2θ. The step scan parameters were 0.02° steps and 2 s counting time per step with a 0.499° divergence slit and a 0.499° antiscatter slit. The X-ray source was Ni-filtered Cu radiation from a sealed tube operated at 40 kV and 40 mA. Phases in the samples were identified by comparison of observed peaks to those in the International Centre for Diffraction Data (ICDD PDF2009) powder diffraction database and also peaks listed in reference articles. Goniometer alignment was ensured using a Bruker-supplied $Al_2O_3$ standard.

Raman Spectroscopy.

Raman spectra were collected using a Renishaw inVia spectrometer equipped with an Leica microscope (objective 50×) and a 514 nm $Ar^+$ laser (power of 9 mW) as the excitation source. In each scan, samples were exposed to the laser for 10 s (one accumulation), and the spectra were obtained in the range of 100-3200 $cm^{-1}$ (Raman shift). The spectrometer was calibrated using a silicon standard, with a strong primary band at 520.5 $cm^{-1}$. Peak positions were fit assuming a Lorentz peak shape and a linear background.

Nanoindentation.

The samples were indented in the load-controlled mode in an MTS XP nanoindenter with a Berkovich diamond tip. Elastic properties are characterized by the Young's modulus, which was calculated on the basis of the initial slope of the unloading curve according to the Oliver-Pharr method. In Oliver-Pharr calculations, Poisson's ratios of diamond and the graphene assemblies of 0.07 and 0.2 were used, respectively, and the Young's modulus of diamond of 1141 GPa was used. Several (>10) indentations were performed on different sample locations and loading directions, and results were averaged. Standard deviation error was +/−10%.

Thermal Gravimetric Analysis.

Thermal gravimetric analysis (TGA) was performed on a PerkinElmer thermogravimetric analyzer. Each sample was heated in 20% $O_2$ (balance Ar) environment at a rate of 10° C./min to at least 900° C. The first derivative of each thermal decomposition curve was calculated to determine the temperature at which the maximum rate of decomposition occurred.

Electrical Conductivity.

Electrical conductivity was measured using the four-probe method with metal electrodes attached to the samples. The amount of current transmitted through the sample during measurement was 100 mA, and the voltage drop along the various sample axes was measured over distances of 3 to 6 mm. Seven or more measurements were taken on each sample, and results were averaged.

Density.

Bulk densities of the samples were determined from the physical dimensions and mass of each sample.

Example 2—Results

The surface area and pore size of conventional aerogels have been shown to be sensitive to heat treatment. Large losses in surface area are typically associated with coarsening of the primary particles in the aerogel network. Comparable losses have even been reported for traditional carbon aerogels. Loss of surface area begins above 1000° C. for resorcinol-formaldehyde-derived carbon aerogels have been reported.

Figure 2:
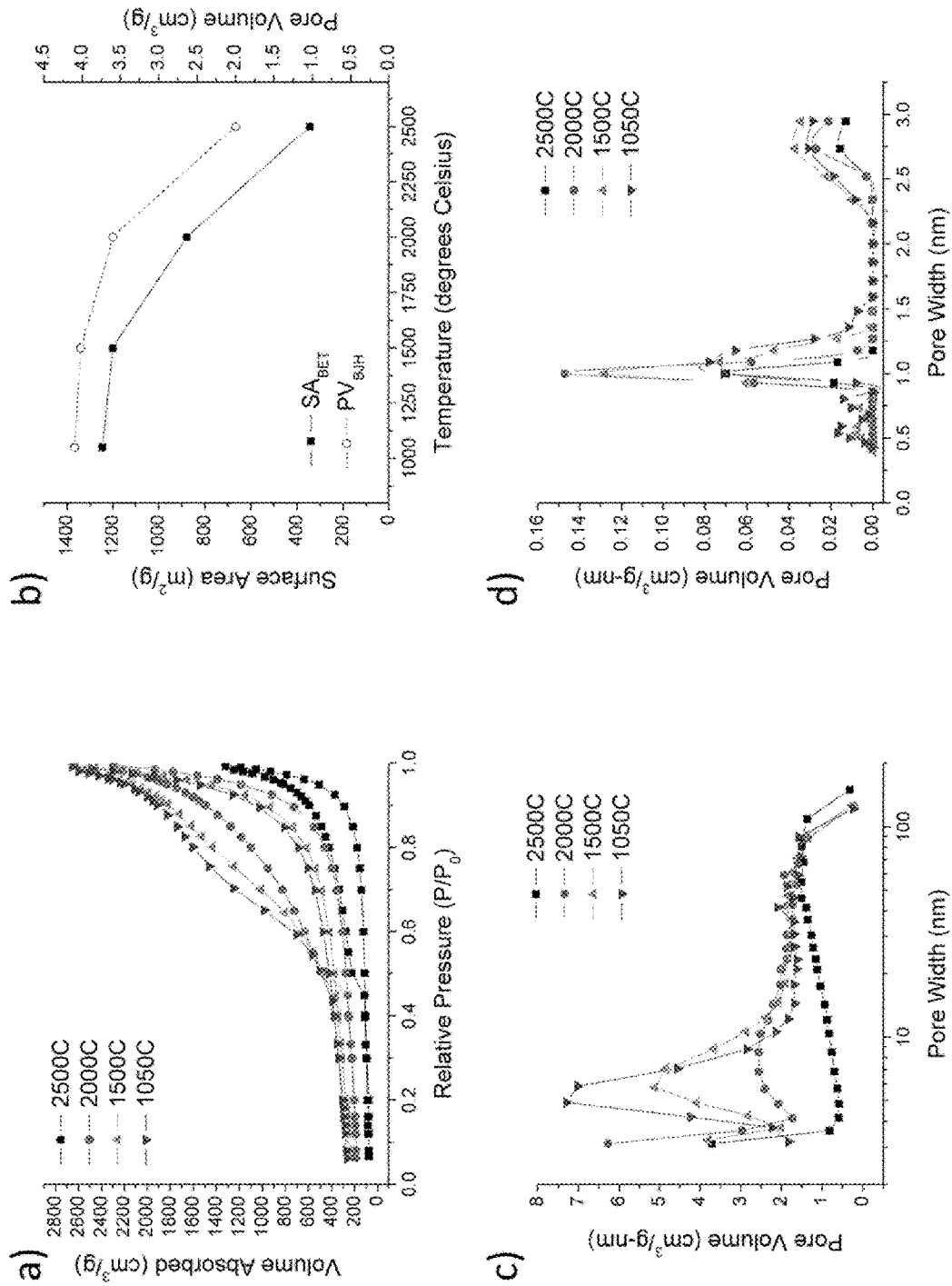
FIG. 2: (a) Nitrogen adsorption-desorption isotherms for GMA at different annealing temperatures. (b) GMA surface area (BET) and pore volume (BJH) vs annealing temperature. GMA pore size distributions in the (c) meso- and (d) micropore regimes.

Nitrogen porosimetry is a useful technique to observe the evolution of the pore morphology with temperature. Nitrogen adsorption/desorption isotherms for the GMA of the present example as a function of temperature (FIG. 2a) are Type IV, indicative of mesoporous (pore diameters of 2-50 nm) material. The observation of a type 3 hysteresis loop (IUPAC classification) at high relative pressure is consistent with other 3D graphene materials. The magnitude of the hysteresis between adsorption and desorption curves corresponds to the amount of pore volume present in the aerogel. The pore volume remains close to 4 $cm^3/g$ at 1050 and 1500° C. At 2000° C. it drops by 10% and then decreases to 2 $cm^3/g$ at 2500° C. (FIG. 2b).

The trend in BET surface area behaves similarly. Surface area is approximately 1200 $m^2/g$ at 1050 and 1500° C., drops to 877 $m^2/g$ at 2000° C., and is further lowered to 345 $m^2/g$ at 2500° C. Pore size distributions in the meso-(2-50 nm) and micropore (<2 nm) regimes are also determined from the nitrogen isotherms as a function of temperature treatment (FIGS. 2c and 2d). In the mesopore regime, the pore size distribution (PSD) exhibits a peak around 5 nm with a tail reaching to higher pore sizes at 1050° C., which is characteristic of the GMA. Above 1500° C., a dramatic loss of the peak at 5 nm is observed as a function of temperature, though pores in the 20-100 nm range remain unchanged. In contrast, the micropore regime shows some changes in the intensity of the peak diameter around 1 nm with increasing heat treatment, but the general shape of the distribution is unchanged. Traditional carbon aerogels typically suffer large losses in both the meso- and micropore regimes above 1000° C. Therefore, these results suggest that the graphene aerogels are much more resistant to coarsening/sintering than traditional aerogels and able to maintain significant surface area and pore volume to much higher temperatures. The surface area and pore volume losses that are observed at 2000 and 2500° C. are a consequence of the loss of pores limited to the 2-10 nm regime. Remarkably, in contrast to traditional aerogels, pores in the 20-100 nm and sub-2 nm ranges remain intact and provide the considerable surface area measured in the annealed GMA up to 2500° C.

Figure 3:
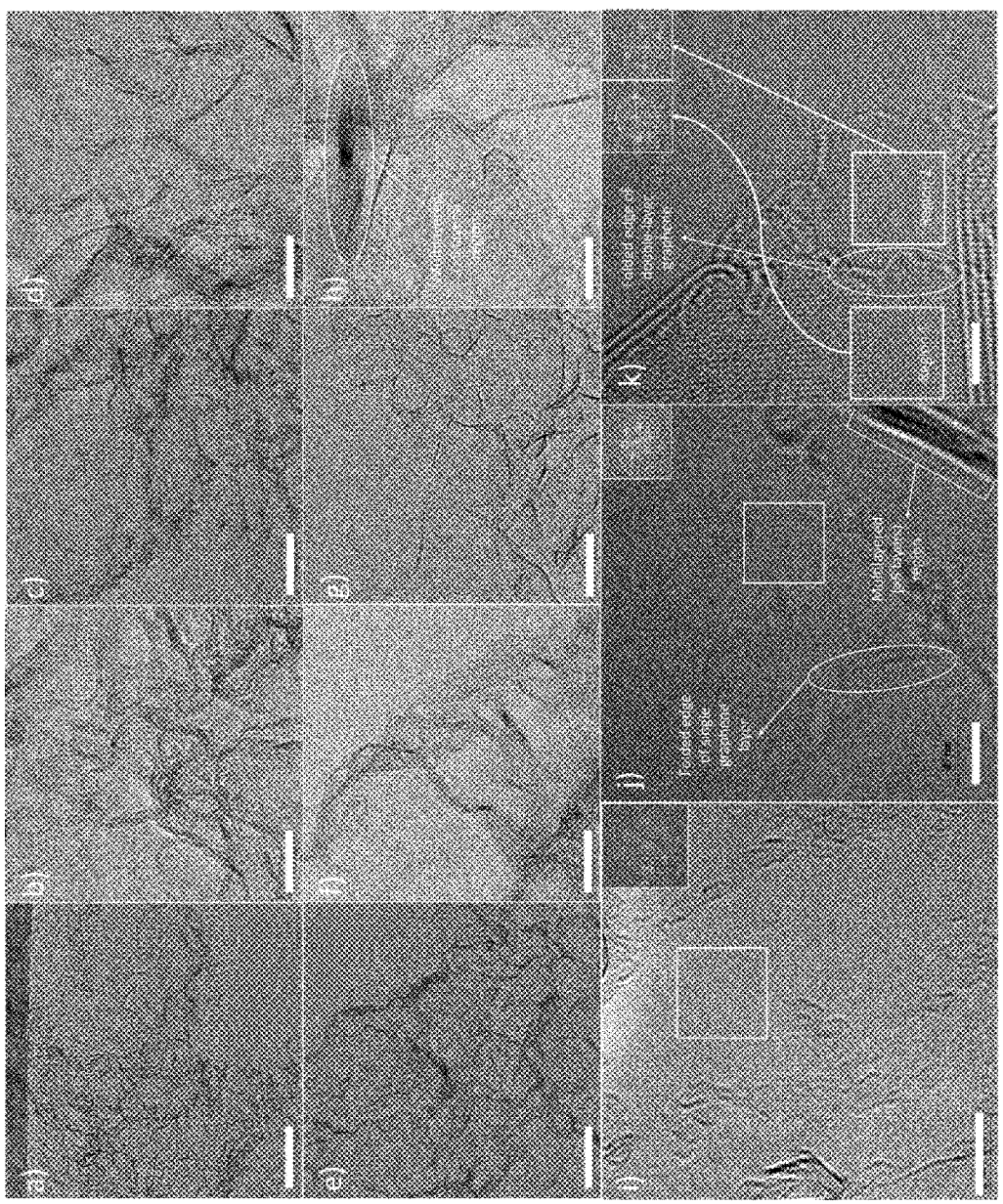
FIG. 3: HRTEM images of GMA annealed at (a, b) 1050° C., (c, d) 1500° C., (e, f, i) 2000° C., and (g, h, j, k) 2500° C. Scale bar is 50 nm in (a), (c), (e), and (g). Scale bar is 10 nm in (b), (d), (f), (h), and (i). Scale bar is 2 nm in (j) and (k).

High-resolution transmission electron microscopy (HR-TEM) is also used to visualize the evolution of the pore morphology with temperature. FIG. 3 presents low and high magnification images of the GMA after each heat treatment. At 1050 and 1500° C., one observes the common "wrinkled sheet" network structure, with sheets primarily 1-3 layers thick (FIG. 3a-3d). The observed pore sizes are predominately sub-20 nm. At 2000° C., one begins to observe changes in the wrinkled sheet morphology (FIGS. 3e, 3f and 3i) such as some flattening of the graphene sheets, and instead of curves, there are well-defined kinks with angles ranging from 110 to 170° that have emerged. Within the flatter layers the atoms appear to be highly ordered over length scales >10 nm as evidenced by the large-area Moiré pattern (FIG. 3i). The Moiré pattern also indicates that though the layers in the few-layer graphene are well ordered, they are not perfectly aligned. Fast Fourier transform (FFT) analysis from selected areas of the HRTEM images indicates the angle of rotation between sheets is typically in excess of 10°. FIG. 3i shows a typical HRTEM image of such a region, which has a rotation angle between graphene sheets of 15+/−0.5°. In the GMA fired at 2500° C., the material appears generally flatter than the material fired at 2000° C. and one observes sizable flat multi-layered (>5 layers) regions as shown in FIG. 3h. The atoms within each layer appear to be highly ordered, as observed for the GMA fired at 2000° C. (FIGS. 3j and 3k). Closer inspection reveals both single-layer graphene honeycomb lattice (also confirmed by the folded edge) with a length scale longer than 10 nm and multilayered (>5 layers) regions suggesting some graphitization of the GMA (FIG. 3j). The inset in FIG. 3j shows the FFT of the HRTEM image of the region outlined by the square, showing a single 6-fold symmetric diffraction pattern. Other regions are found to contain graphene sheets with a rotation angle between layers as shown in FIG. 3k. The FFT of region 1 shows the rotation angle between the two layers of graphene is approximately 30° and the folded edge between regions 1 and 2 gives the information about the number of layers. Region 2 is single-layer graphene. Furthermore, the HRTEM images for 2500° C. show that the dominant pore size appears to shift above 20 nm. The increase in pore size with heat treatment is consistent with the PSD revealed from porosimetry measurements (FIG. 2c) indicating a loss of the 2-10 nm pore with increasing temperature. At 2500° C., porosimetry indicates that pores in the 20-100 nm range dominate, which is in excellent agreement with the HRTEM images. The observation of multilayers at high temperatures is consistent with the lower surface areas and pore volumes measured at 2500° C. The flattening/kinking of the graphene sheets and long-range order (Moiré pattern) suggest significant crystallization at higher temperatures. Further characterization with more focused techniques will provide more details concerning crystallinity of the annealed GMAs.

Figure 4:
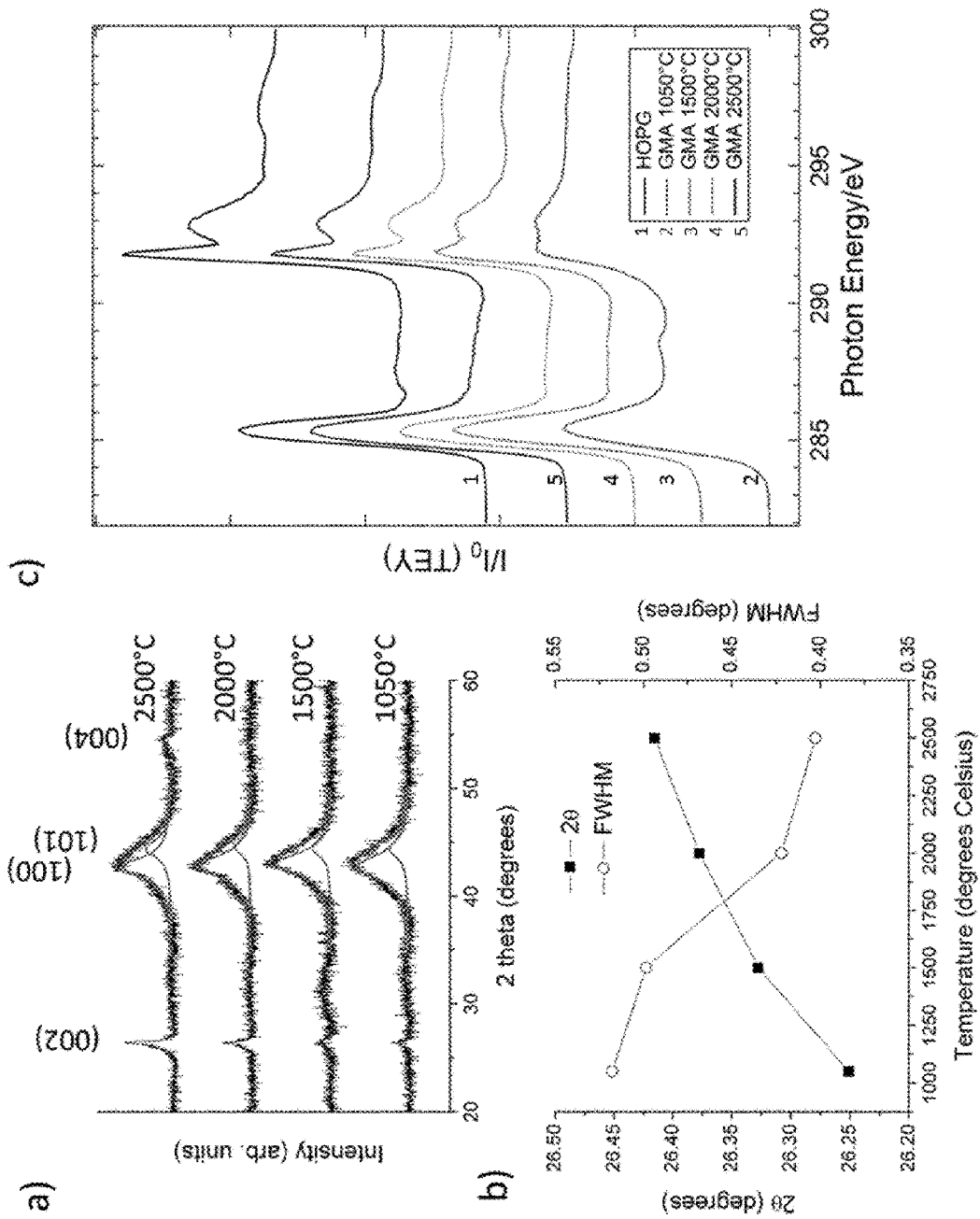
FIG. 4: (a) XRD patterns for GMA at different annealing temperatures. Smooth lines denote peak fits for (100) and (101) diffraction peaks. (b) Plots of (002) diffraction angle and full width at half-maximum (fwhm) for GMA vs annealing temperature. (c) XAS spectra for GMA after annealing at different temperatures. Spectra offset for clarity.

X-ray diffraction (XRD) is an effective technique for probing the amount and orientation of graphitic carbon layers as well as the curvature of the individual sheets. FIG. 4 shows XRD patterns for the graphene aerogel after different heat treatments. All samples show a weak (002) peak at ~26° compared to HOPG or bulk graphite, suggesting minimal stacking of sheets (predominantly single and few-layer graphene). The small increase in (002) peak intensity and the appearance of a weak (004) peak in samples annealed at 2500° C. indicates more stacking, which is consistent with the HRTEM images showing the appearance of regions with >5 layer stacks. FIG. 4b also shows that the (002) full width at half-maximum (fwhm) decreases and (002) peak position increases with temperature. This is evidence of less graphene sheet curvature in the samples annealed at higher temperatures and is also supported by the appearance of the (004) peak and the HRTEM results. It is also interesting to note the asymmetry in the (002) peak at 2000 and 2500° C. This asymmetry is consistent with increased interlayer spacing due to the rotation between layers as observed in turbostratic graphite. Lastly, there is an evolution in the broad (100)/(101) peak at 43-45° with increasing temperature. Peak fits (FIG. 4a) show an increase in the (101) peak intensity at 2500° C. An increase in the (101) peak intensity is evidence of more ordered stacking between layers (less rotation or translation). Thus, all of the XRD results suggest a less defective graphene aerogel emerges after heat treatment while restacking of graphene layers is minimized.

X-ray absorption spectroscopy (XAS) is an angular momentum resolved probe of the unoccupied density of electronic states and, as such, can provide detailed information regarding local chemical bonding and insight into the quality and crystallinity of the graphene aerogel with heat treatment. FIG. 4c displays XAS spectra recorded at the carbon K-edge for GMA heated to different annealing temperatures. All of the spectra exhibit features characteristic of highly $sp^2$-hybridized carbon. These features include a sharp resonance at ~285.4 eV arising to C(1 s)→π* transitions, a resonance at ~291.5 eV that is attributed to a core-hole exciton state, a broad onset to the core-hole exciton feature beginning at energies 289.5 eV and higher attributed to C(1 s)→C—H σ*/R* transitions, and a series of broad resonances above 291.5 eV arising from C(1 s)→C—C σ* transitions. The as-prepared GMA exhibits an additional resonance at 288.5 eV that is attributed to C(1 s)→C—O σ* transitions, which is indicative of oxygen-based surface functionalities (e.g., carboxyl, hydroxyl or epoxide groups). Significantly, the intensity of this resonance is substantially diminished following annealing at 1500° C. and is completely absent from the XAS spectra after annealing at higher temperatures, providing a clear indication that the oxygen-based functional groups are successfully removed by thermal annealing.

The core-hole exciton feature and the broad onset that immediately precedes it are also observed to undergo pronounced changes as a function of the annealing temperature. More specifically, the intensity of the broad absorption onset substantially diminishes upon annealing of the GMA at temperatures of 1050° C. and above, indicating that the proportion of carbon bonded to hydrogen falls below the detection limits of the technique (~2%). Meanwhile, the core-hole exciton feature, which occurs due to the presence of extensive planar sheets of highly conjugated $sp^2$ carbon, is observed to sharpen and increase in intensity with increasing annealing temperature. This evolution in the core-hole exciton feature is consistent with an increase in the crystallinity and domain size of the graphene sheets within the GMA. Equally, C—H bonds can only be present at domain edges or as defects in the graphene ligaments, and as such, the reduction in the C—H σ*/R* resonances arise due to an increase in domain size (reduction in the proportion of edge sites) or healing of defect sites under thermal annealing (increased crystallinity).

Figure 5:
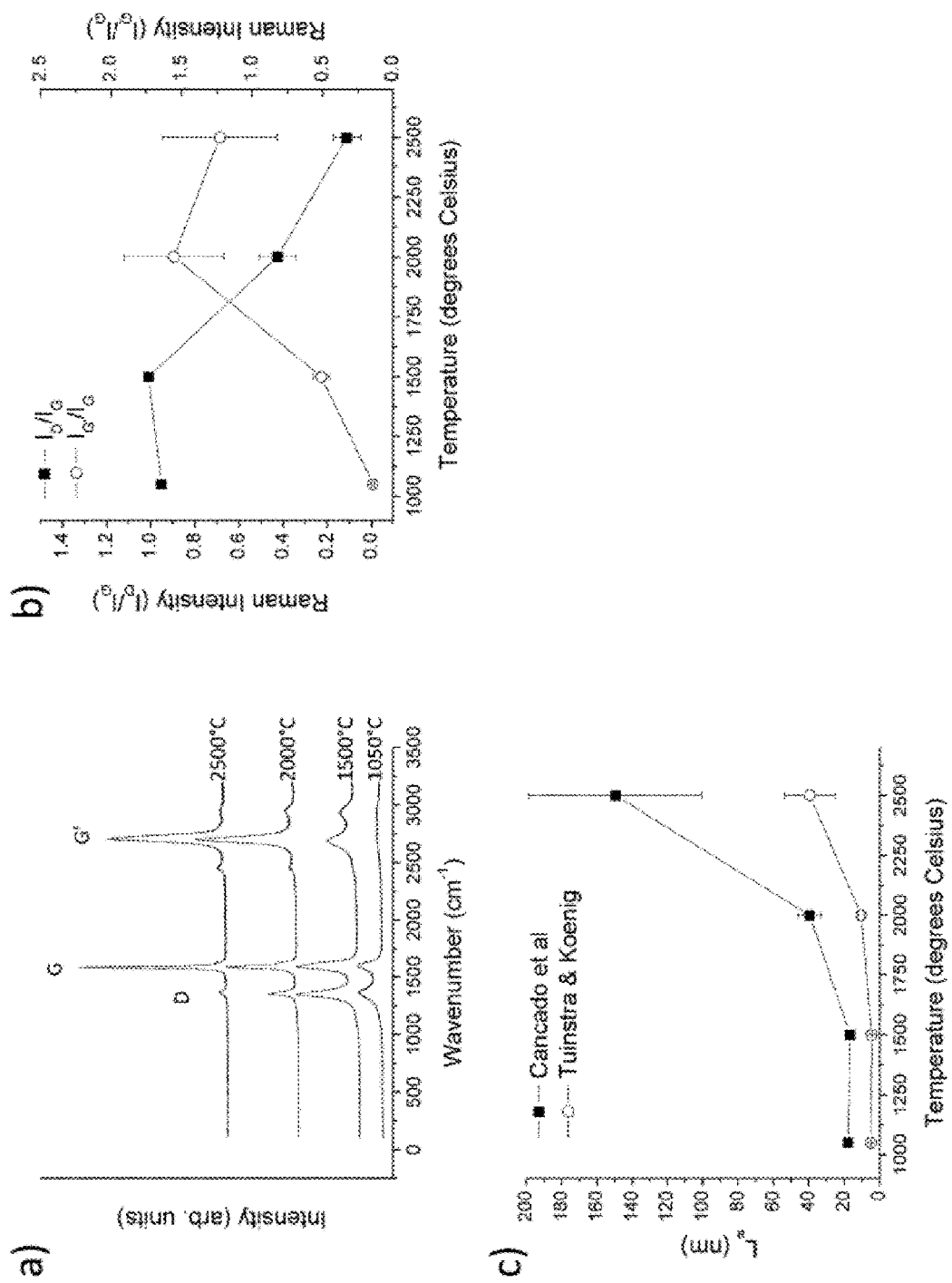
FIG. 5: (a) Raman spectra for GMA after annealing at 1050, 1500, 2000, and 2500° C. (b) Plot of Raman $I_D/I_G$ and $I_{G'}/I_G$ for GMA vs annealing temperature and (c) crystallite size, La, of GMA vs annealing temperature.

Raman spectroscopy is considered the gold standard for probing graphene due to its sensitivity to defects, chemical doping, and number of graphene layers present. Raman spectra for typical GO-based graphene aerogels fired at <1500° C. (FIG. 5a) look very similar to those of traditional carbon aerogels with strong, broad D and G bands and weak, ill-defined D' and G' bands. Heat treatments of carbon aerogels at 2500° C. result in a sharpening of the bands, but the D band remains dominant, indicative of nanocrystal-line graphite. In contrast, parts a and b of FIG. 5 show that above 1500° C., in addition to a significant sharpening of the peaks, there is an order of magnitude decrease in the D/G band intensity ratio. This dramatic decrease in D/G ratio indicates a removal of a considerable number of defects and is in agreement with decreased curvature seen in HRTEM and XRD results. The presence of a small D band at 2500° C. likely arises from the persistence of kinks and folds in the graphene sheets as seen in HRTEM. The D/G ratio is also an indicator of the crystallite size of the graphene sheets. Larger crystallite size means larger single crystal graphene domains (e.g., better crystallinity). As shown in FIG. 5c, the graphene aerogels reported here show crystallite sizes >40 nm using the Tuinsta and Koenig method (*J. Chem. Phys.*, 1970, 53:1126) and as high as 150 nm using the Cancado method (*Appl. Phys. Lett.*, 2006, 88:163106). Large graphene domains in the 20-100 nm range are consistent with observations in HRTEM and nitrogen porosimetry for the annealed GMA. This large crystallite size represents an order of magnitude improvement over traditional carbon aerogels or previously reported graphene aerogels.

The Raman spectra of the graphene aerogels treated at 2000 and 2500° C. also reveal dramatic changes in the G' band at ~2700 $cm^{-1}$. The G'/G band intensity ratio and the shape/position of the G' band provide indicators of the number of layers and/or how well the layers are stacked. Single graphene layers have G'/G ratios>1, and the G' band is a narrow, single peak. Bulk graphite, few-layer, and bilayer graphene layers with ordered stacking have G'/G<1, and the G' band has a broad complex shape with a upshift in peak position compared to a single graphene sheet. The upshift scales relative to the number layers in the stack. And finally, turbostratic graphite has G'/G~1, and the G' band is a single, broadened peak with a large upshift relative to graphite. Turbostratic graphite also has a D band. The graphene aerogel treated at 2000 and 2500° C. has a G'/G≈1 (FIG. 5a). The G' band is a single, broad (fwhm of 60 $cm^{-1}$) peak with a minimal shift (2698+/−6 $cm^{-1}$) compared to single-layer graphene. This unique Raman signature appears to support the HRTEM results indicating few- and bilayer turbostratic (rotated) graphene. The decoupling of the layers due to rotation gives the G'/G≈1 and peak broadening, while the minimal number of layers results in the minimal peak shift relative to a single graphene. And finally, the high degree of crystallinity within each layer results in the diminished D band.

Figure 6:
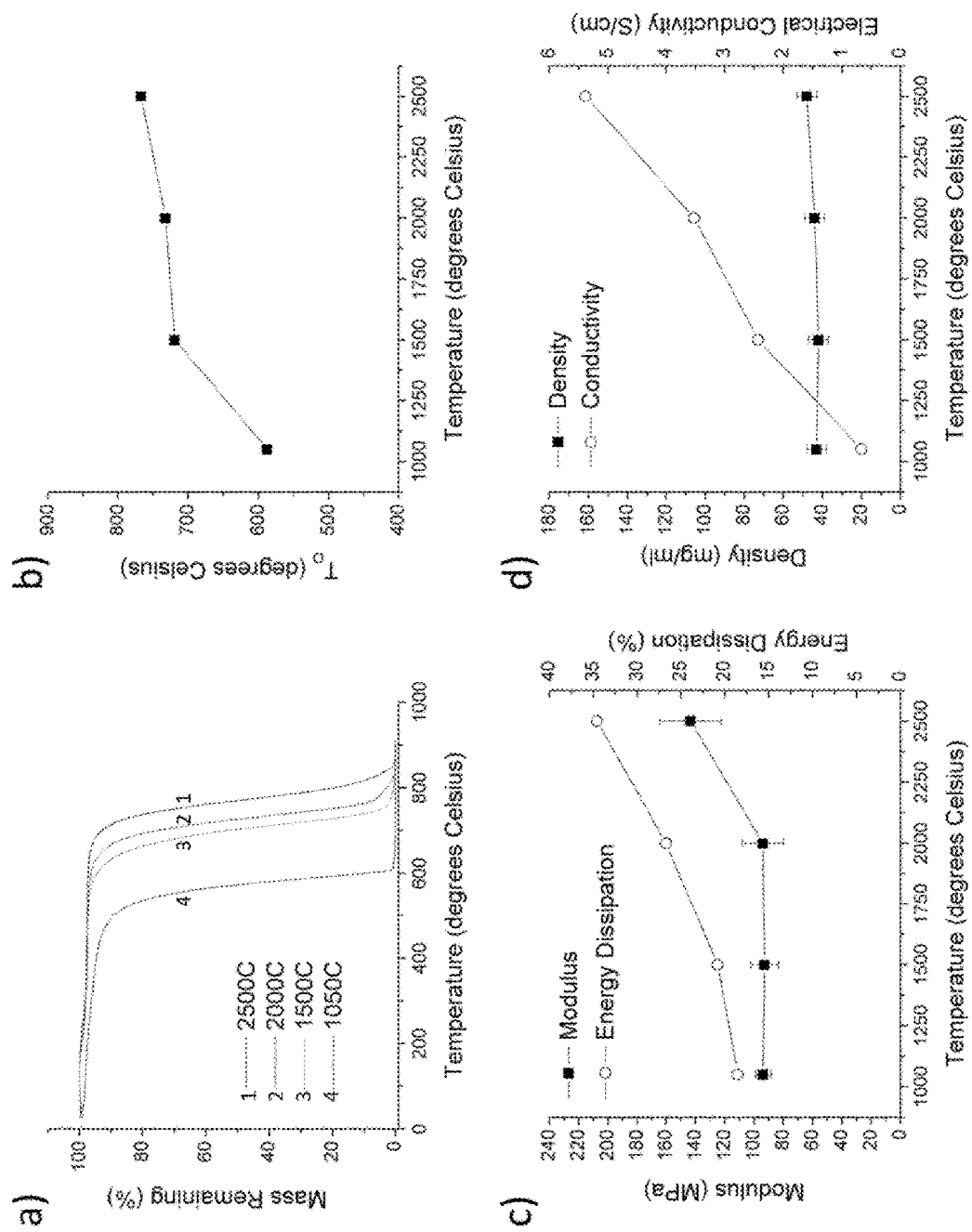
FIG. 6: (a) TGA curves for the GMA treated at 1050, 1500, 2000, and 2500° C. (b) Oxidation temperature, $T_O$, of GMA vs annealing temperature. (c) Young's modulus and energy loss for GMA vs annealing temperature. (d) Bulk density and electrical conductivity of GMA vs annealing temperature.
Figure 7:
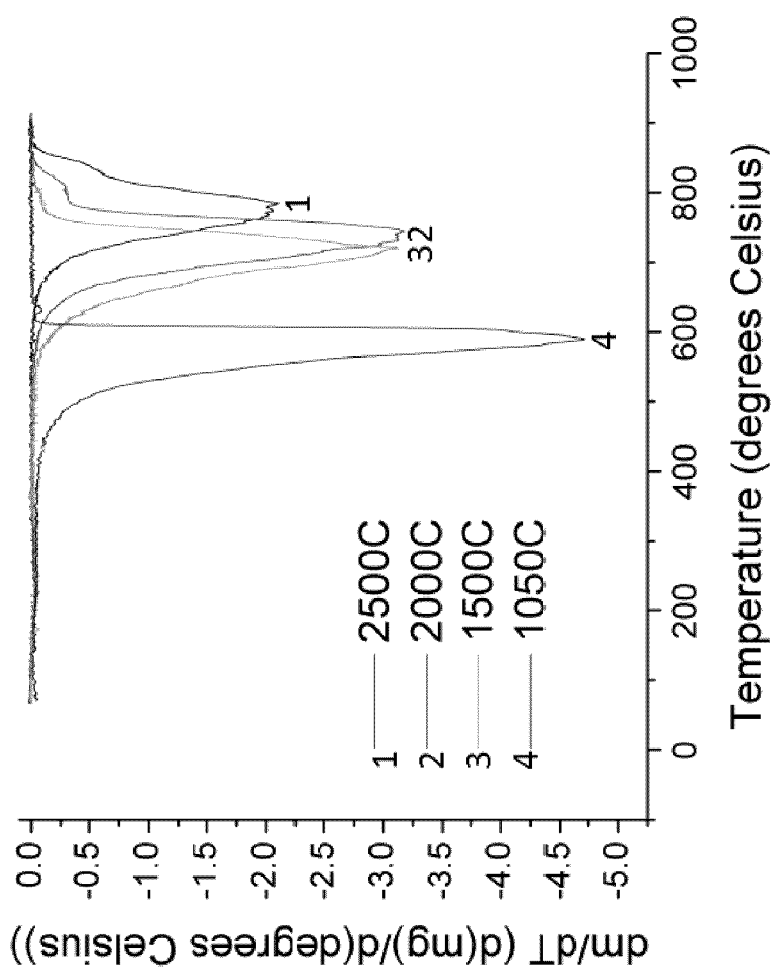
FIG. 7: Plot of the mass loss rate (dm/dT) as a function of temperature for the GMA treated at 1050° C., 1500° C., 2000° C., and 2500° C. The temperature at the peak of each curve is taken as the oxidation temperature, $T_O$. The first derivative (rate of mass loss) of the TGA curves, dm/dT, where m is mass and T is temperature, were used to determine the oxidation temperature, $T_O$. $T_O$ is defined as the temperate at the maximum rate of mass loss (dm/dT$_{max}$), or peak values observed in FIG. 6.
Figure 8:
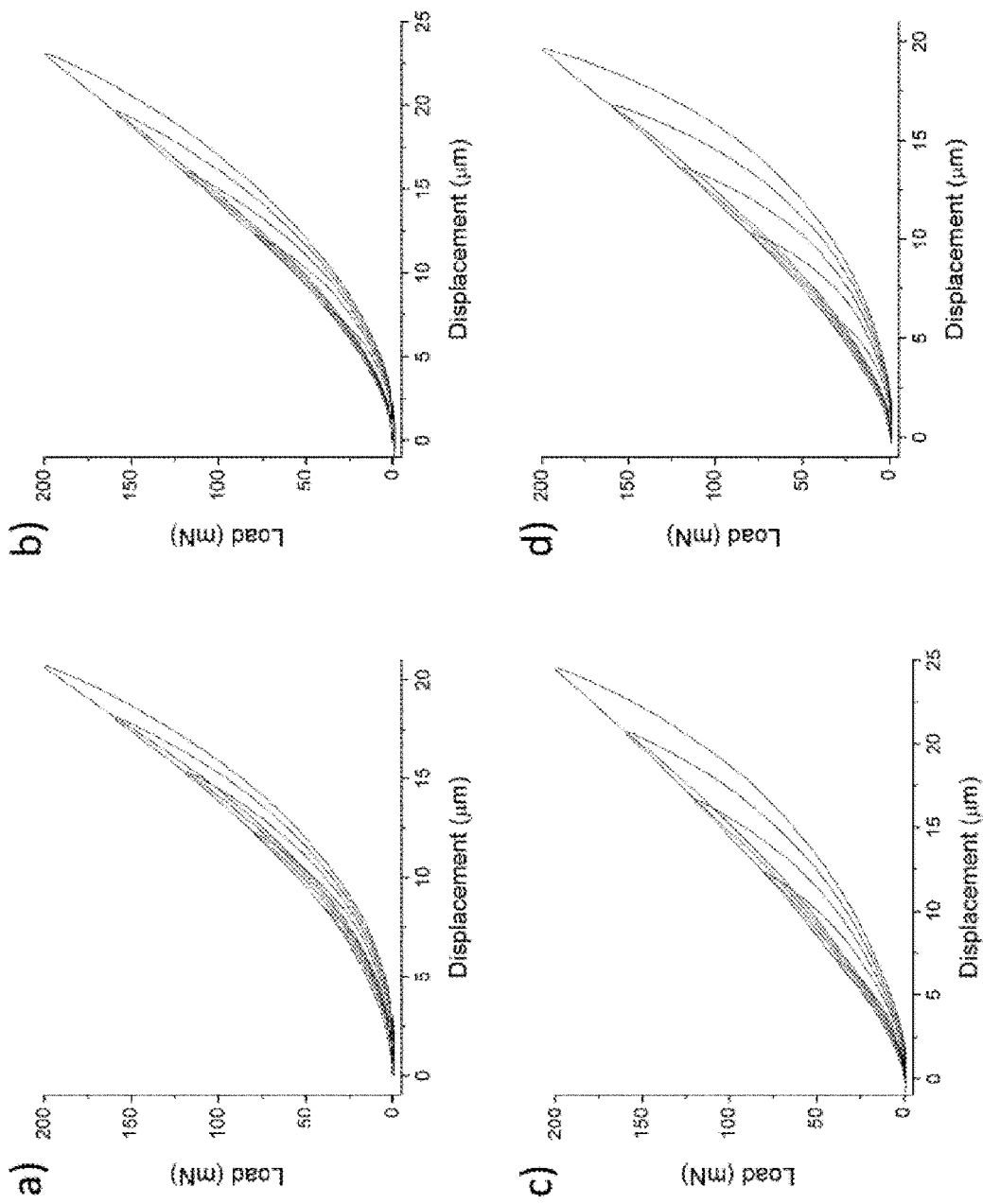
FIG. 8: Load vs displacement curves for GMA annealed at a) 1050° C., b) 1500° C., c) 2000° C., and d) 2500° C. The size of the hysteresis loop between the loading and unloading curves increases with increasing temperature, suggesting increasing energy dissipation. The % energy dissipated (ED) was $$E_D = \frac{(A_{load} - A_{unload})}{A_{load}} * 100\%,$$

To date, the only report of such high quality Raman spectra from a three-dimensional graphene macro-structure required chemical vapor deposition (CVD) onto a macroporous metal foam substrate. Because of the high level of graphene crystallinity in that structure, good mechanical properties and order of magnitude improvements in electrical conductivity were reported. The GO-based graphene aerogel with ultrafine pore size also produced excellent mechanical properties, enhanced electrical conductivities, and robust thermal stability with the improvement in graphene quality. Thermal gravimetric analysis (TGA) in oxygen was performed on the GMA to determine its thermal stability in air. FIG. 6a shows that as the GMA is annealed at higher temperatures, it becomes more resistant to oxidation in air. A quantitative determination of thermal stability was determined via the oxidation temperature, $T_O$ (i.e., the temperature of maximum rate of mass loss, FIG. 7). FIG. 6b shows that $T_O$ for the GMA increases from less than 600° C. for the standard GMA (1050° C.) to almost 800° C. after the 2500° C. anneal. This improvement of nearly 200° C. in thermal stability is due to the decreased defect density of the highly crystalline GMA and makes them suitable for high-temperature sensing and catalyst applications. Nanoindentation results (FIG. 6c and FIG. 8) show that the modulus of the aerogel increases from ~90 to 143 MPa after the 2500° C. anneal. This increase in stiffness is a 50% improvement over the standard GMA (1050° C.) and 3-14 times larger than values previously reported for graphene aerogels with comparable densities (<100 mg/cm³). As the GMA does not exhibit significant densification with annealing, the ~50% improvement in stiffness is attributed to the larger, flatter crystalline domains present at 2500° C. All samples exhibit primarily elastic behavior showing nearly full recovery after each loading-unloading cycle (FIG. 8). However, there were significant differences in the hysteresis loops, indicating changes in energy dissipation behavior with temperature. FIG. 6c shows that the energy loss in the aerogel during compressive loading and unloading increases with temperature. The effective doubling in energy dissipation behavior by 2500° C. suggests enhanced performance for the highly crystalline GMA in energy absorbing applications.

Four-point probe electrical measurements of the graphene aerogel show an increase in electrical conductivity of roughly an order of magnitude between GMA samples annealed at 1050 and 2500° C., which increases linearly with annealing temperature and reaches >5 S/cm at 2500° C. (FIG. 6d). This is surprising and unexpected, because it is in contrast to previous report showing no improvements in electrical conductivity above 1800° C. for carbon aerogels. The electrical conductivity demonstrated here also represents a 2-10 fold increase over comparable graphene aerogels. Moreover, the high electrical conductivity is on the order of that reported for the CVD-grown macroporous graphene foam. In addition to polymer composite applications, this order of magnitude drop in resistance could be a game-changer for important energy technologies, such as capacitive deionization and fuel cells, which could reap large energy efficiency gains from a lower resistance electrode.

In summary, provided here is a general strategy for producing high quality GO-based graphene aerogels via high-temperature annealing. These annealed GMAs maintained high surface area and ultrafine pore sizes even at temperatures up to 2500° C. HRTEM shows that the annealed GMAs comprise primarily of highly crystalline single and few-layer graphene. XRD studies confirm the removal of various defects with rising annealing temperature. Raman characterization is particularly informative, showing a steady decrease in defects and a marked increase in crystallite size with increasing temperature. Finally, it is observed that the improved quality of the graphene sheets in the annealed GMAs results in enhanced thermal stability and an order of magnitude increase in Young's modulus and bulk electrical conductivity compared to standard GO-based aerogels. With the already extensive and broad usage of GO-based aerogels in applications like supercapacitors, lithium ion batteries, biomimetics, and water remediation, the availability of CVD-grade GO-based graphene aerogels will lead to significant performance enhancements for a wide range of technologies.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A composition comprising at least one graphene aerogel comprising a three-dimensional structure of graphene sheets, wherein the graphene sheets are covalently interconnected, wherein the graphene aerogel has a Raman spectra in which $I_D/I_G$ is 0.7 or less, wherein the graphene aerogel has an electrical conductivity of 200-600 S/m and a density of 80 mg/ml or less, and wherein the graphene aerogel is produced by a process comprising thermal annealing at a temperature of 1500-3500° C.

2. The composition of claim 1, wherein the graphene aerogel has a Raman spectra in which $I_{G'}/I_G$ is 0.5 or more.

3. The composition of claim 1, wherein the graphene aerogel has an average crystallite size $L_a$ of 30 nm or more.

4. The composition of claim 1, wherein the graphene aerogel has an electrical conductivity of 300-600 S/m.

5. The composition of claim 1, wherein the graphene aerogel has an oxidation temperature $T_O$ of 700° C. or more.

6. The composition of claim 1, wherein the graphene aerogel has a Young's modulus of 50 MPa or more.

7. The composition of claim 1, wherein the graphene aerogel has a density of 60 mg/ml or less.

8. The composition of claim 1, wherein the graphene aerogel has a BET surface area of 300 m²/g or more.

9. The composition of claim 1, wherein the graphene aerogel has a pore volume of at least 1 cm³/g.

10. The composition of claim 1, wherein pores having a diameter of 100 nm or less account for 50% or more of the total pore volume of the graphene aerogel.

11. The composition of claim 1, wherein pores having a diameter of 100 nm or less account for 50% or more of the total pore number of the graphene aerogel.

12. The composition of claim 1, wherein 70% or more of the covalent bonds interconnecting the graphene sheets are $sp^2$ carbon bonds.

13. The composition of claim 1, wherein the graphene aerogel has an atomic oxygen content of 5% or less.

14. The composition of claim 1, wherein the graphene aerogel is in the form of a monolith having at least one lateral dimension of 1 mm or more.

15. The composition of claim 1, wherein the graphene aerogel consists essentially of covalently interconnected graphene sheets.

16. The composition of claim 1, wherein the composition does not comprise a macroporous foam.

17. A method for making the graphene aerogel of claim 1, comprising:
   preparing a mixture comprising a graphene oxide suspension and at least one catalyst;
   curing the mixture to produce a wet gel;
   drying the wet gel to produce a dry gel; and
   thermally annealing the dry gel at a temperature of 1500-3500° C. to produce the graphene aerogel.

18. The method of claim 17, wherein the dry gel is thermally annealed at a temperature of 2000-3000° C.

19. The method of claim 17, wherein the mixture consists essentially of the graphene oxide, the catalyst, and at least one solvent.

20. A device comprising the composition of claim 1.

* * * * *